Sept. 13, 1932.  E. WILDHABER  1,877,104
ROTARY MEMBER FOR FORMING GEARS
Filed June 1, 1927  3 Sheets-Sheet 1

INVENTOR

Ernest Wildhaber

Sept. 13, 1932.   E. WILDHABER   1,877,104
ROTARY MEMBER FOR FORMING GEARS
Filed June 1, 1927   3 Sheets-Sheet 2
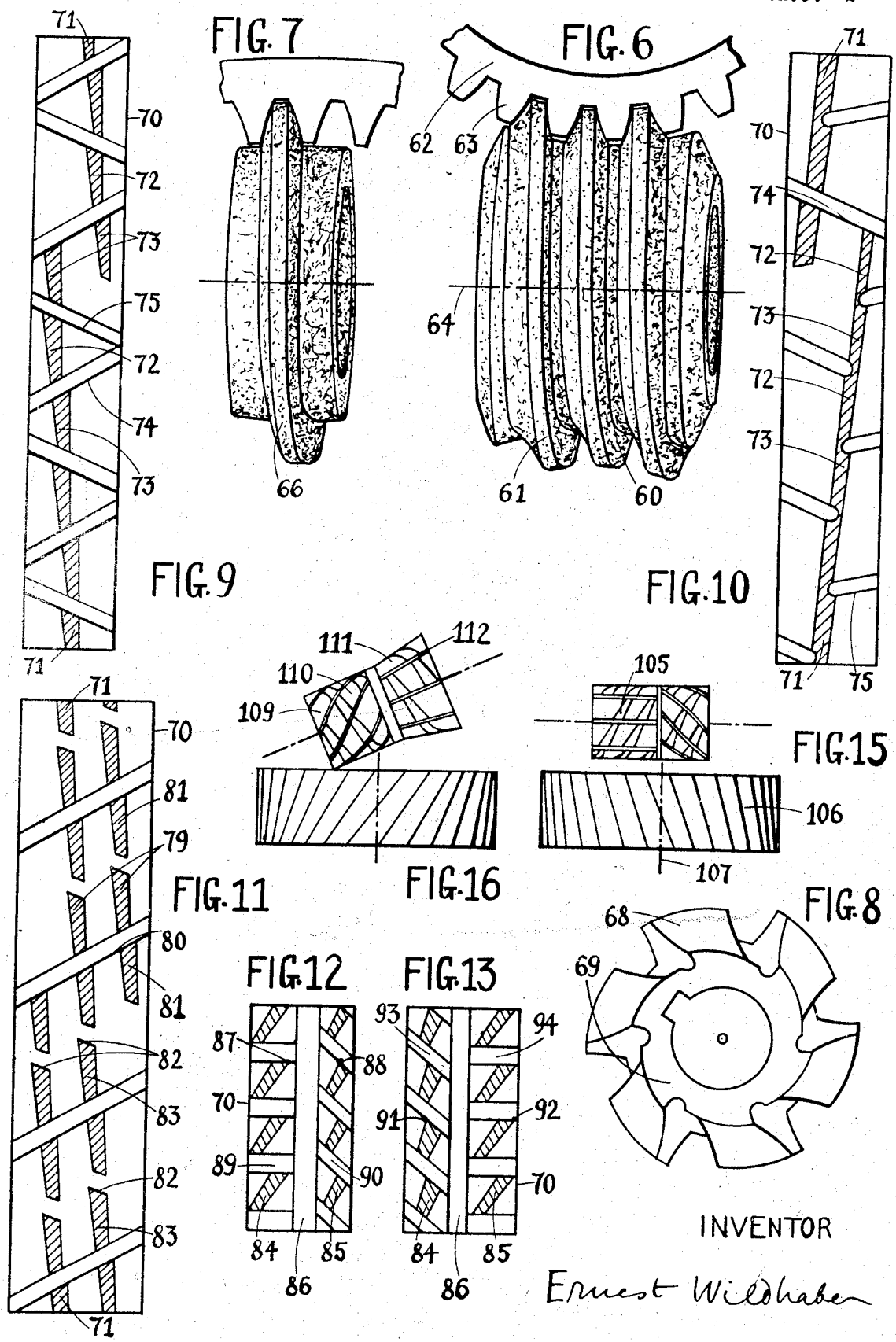
INVENTOR
Ernest Wildhaber

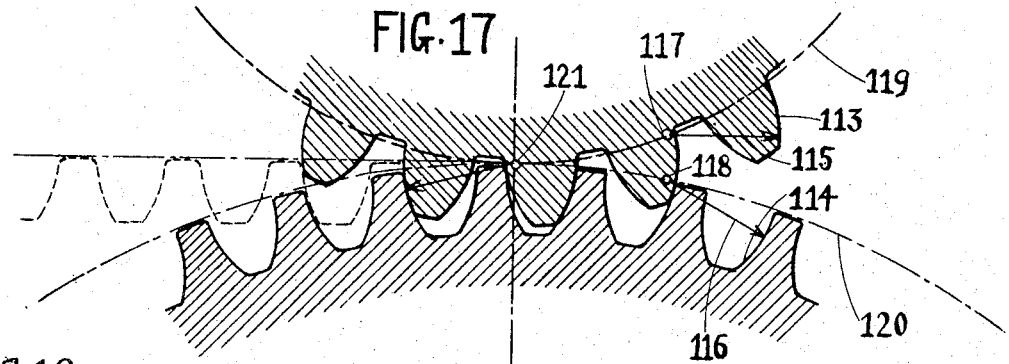
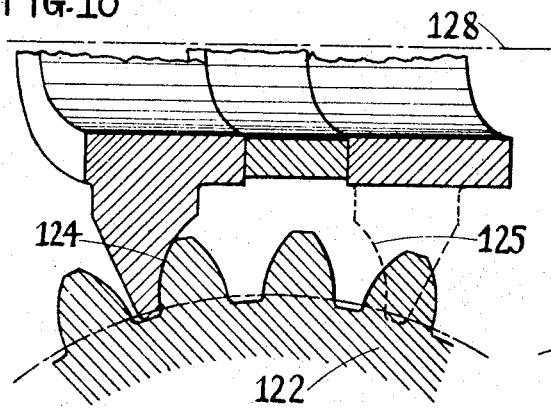
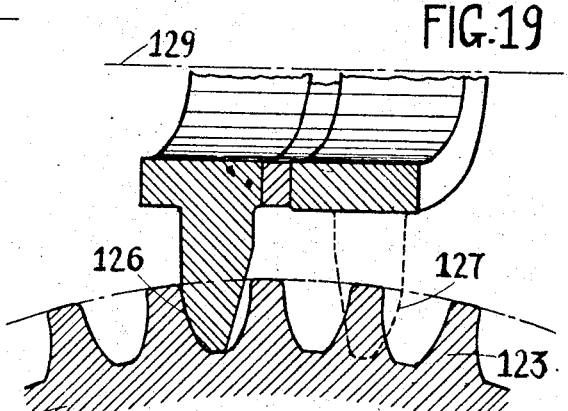
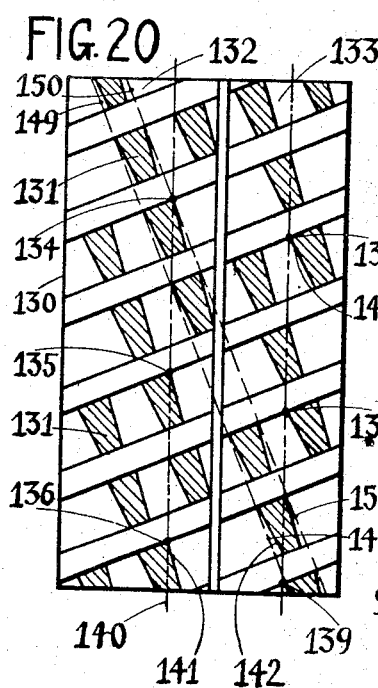
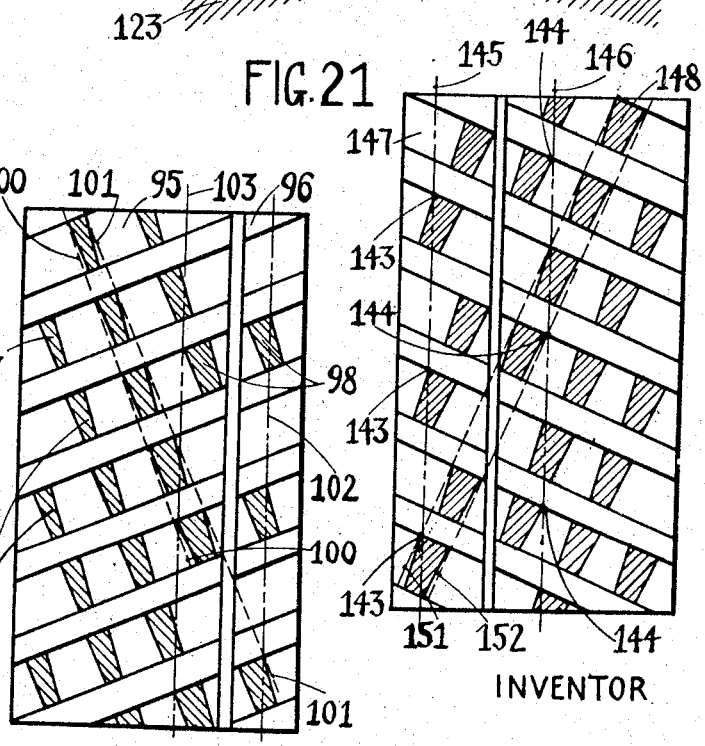

Patented Sept. 13, 1932

1,877,104

UNITED STATES PATENT OFFICE

ERNEST WILDHABER, OF BROOKLYN, NEW YORK

ROTARY MEMBER FOR FORMING GEARS

Application filed June 1, 1927. Serial No. 195,716.

The present invention relates to rotary members for forming teeth on gears, primarily teeth of constant profile, such as straight teeth, helical teeth or threads, and double helical or herringbone teeth, in an operation in which said member acts on a continuously rotating blank.

Reference is made particularly to such rotary members which contain a number of cutting edges suitably arranged for acting on a rotating blank, and which are commonly known as hobs.

As well known, a usual gear hob contains a great number of cutting teeth, and hence is an expensive tool, particularly so, when its pitch is coarse.

One object of my invention is to provide a hob of such character as to require only a fraction of the number of cutting teeth of known hobs. Another object is to devise a hob of such character that the whole length of a tooth profile of a gear blank may be formed with a single cutting tooth.

Known hobs for forming straight and helical teeth on gears contain cutting teeth arranged in threads of such configuration, that they are conjugate to the teeth of a rack. It is an object of my invention to provide a rotary cutting member containing cutting portions lying in surfaces which are conjugate to the tooth surfaces of a gear and preferably directly conjugate to the tooth surfaces of the gear to be cut, while not being conjugate to a rack, as will be explained fully hereafter.

Another purpose is to devise a hob which is suited to cut internal gears.

Further objects are to provide a hob for carrying out my method of cutting gear teeth, as described in my copending application, Serial No. 12,572, filed March 2, 1925, and to provide a hob for cutting helical gears of the type disclosed in my Patent No. 1,601,750.

Other aims are to provide a hob of such character that it finishes opposite sides of gear teeth with different cutting teeth, and that cutting faces of different and suitable inclinations may be provided on the respective cutting teeth, to establish very keen cutting edges.

Other objects will be apparent in the course of the specification and from recital of the appended claims.

The invention is exemplified in the accompanying drawings, in which

Fig. 5 indicates a way of obtaining the shape of the cutting edges.

Fig. 6 is a view of a grinding member embodying the same form of threads.

Fig. 7 is a view of another grinding member in engagement with an internal gear, constructed according to my invention.

Fig. 8 is an end view of a disk like cutting tool formed in accordance with the present invention.

Figures 9–14 are developments of cutting tools of hob form, constructed according to various embodiments of my invention.

Fig. 15 and Fig. 16 are diagrammatic views of hobs prior to engagements with gear blanks.

Fig. 17 is a sectional view of a pair of helical or herringbone gears, indicating a form of tooth to which my novel hobs are especially well applicable.

Fig. 18 is a normal section through the teeth of a gear of Fig. 17, and of a cutting tool.

Fig. 19 is a normal section through the teeth of the other gear of Fig. 17, and of a cutting tool.

Fig. 20 and Fig. 21 are developments of the peripheries of modified hobs, such as may be used for producing a pair of gears containing helical teeth with convex and concave circular tooth profiles respectively.

Figure 1:
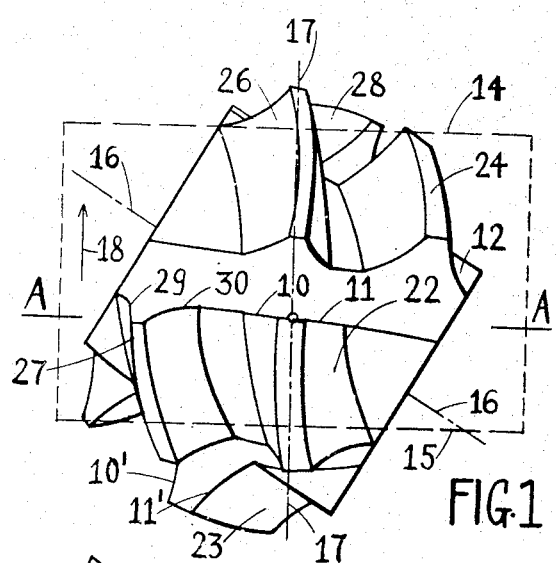
Fig. 1 is a plan view of a cutting tool or hob constructed in accordance with my invention.
Figure 2:
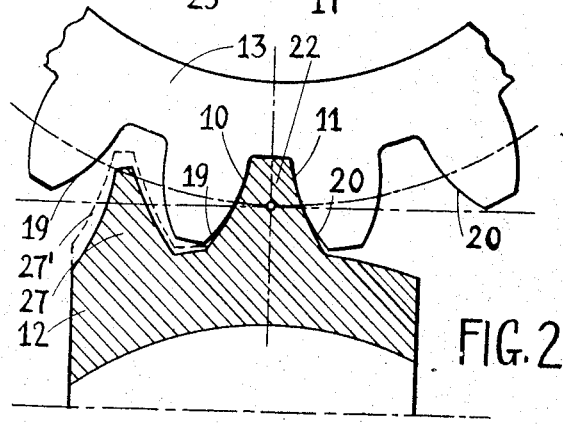
Fig. 2 is a normal section through the thread of the cutting tool shown in Fig. 1, along lines A—A of Fig. 1, the tool being shown in cutting engagement with the teeth of a blank.

Referring to the drawings, and particularly to the Figures 1 and 2, the reference characters 10 and 11 denote two concavely curved cutting edges of a cutting tool 12. A blank 13 is shown in an end view in Fig. 2, and part of its contours are indicated in Fig. 1 at 14 and 15.

To cut teeth in blank 13, cutting tool 12 is rotated on its axis 16, and blank 13 is turned on its axis 17 in timed relation to the rotation of tool 12. In addition, a feeding motion in direction 18 is provided between tool and blank, parallel to the axis 17 of the blank.

A hob of known type forms teeth in a generating operation. The tooth profiles (19 and 20) are then formed by a great number of cutting teeth, of which each cuts a small flat, and thus contributes its share to building up a tooth profile. These cutting teeth have each a different position along the hob axis.

In contradistinction thereto, the cutting edges 10 and 11 are so shaped as to cover the whole length of the tooth profiles 19 and 20, so that no further cutting edges would be necessary to form the profiles 19 and 20.

My hobs for cutting gears therefore differ from known gear hobs, by not being generating tools, in the specific meaning of the word. In many aspects they might rather be called copying tools, although this should not imply that the cutting edges 10 and 11 are always identical with the tooth profiles 19 and 20.

My hobs differ from milling cutters of disk form for milling gears tooth after tooth, by requiring a continuous indexing motion of the blank, and therefore by forming the teeth in a continuous cycle.

Instead of a single finish cutting tooth 22, a plurality of identical finish cutting teeth 22, 23, 24 may be provided on the cutting tool, as shown in the drawings. If so desired, these finishing teeth of the cutting tool may be relieved from part of their burdens, by providing in addition teeth 26, 27, 28 ahead of the teeth 22, 23, 24. The cutting edges 29, 30 of such teeth have preferably the same shape as the cutting edges 10 and 11. They are however so positioned as not to come in contact with the finished tooth surfaces, and do only roughing work.

In Fig. 1 and Fig. 2 the cutting edges 10′ and 29 and on the other hand 11′ and 30 lie in helices of slightly different lead, as evident from the narrower section of tooth 27 (Fig. 2). In this figure the dotted outline 27′ indicates the top position of tooth 27.

Figure 3:
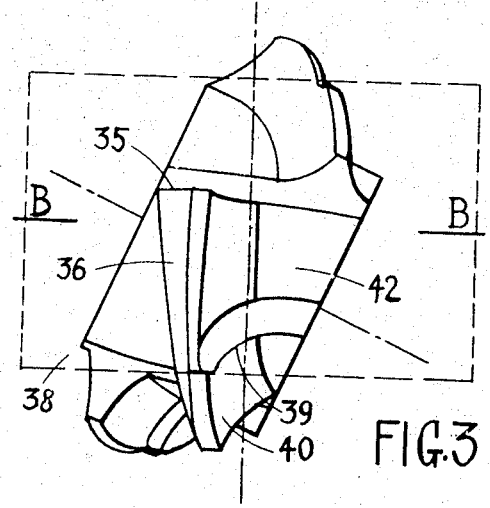
Fig. 3 is a plan view of a slightly modified cutting tool or hob.
Figure 4:
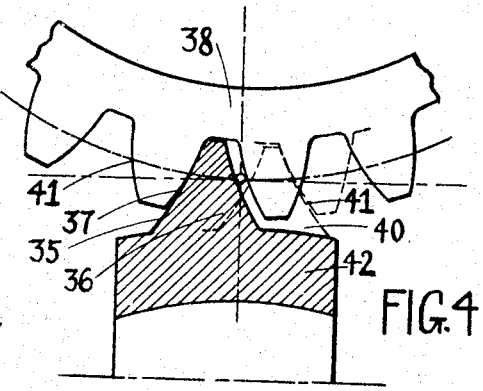
Fig. 4 is a normal section through the tool shown in Fig. 3, in the direction of lines B—B of Fig. 3.

A modification of my invention is indicated in Fig. 3 and Fig. 4.

These two figures, as well as Fig. 1 and Fig. 2 illustrate the process as applied to spur gears with straight teeth, and particularly involute teeth, but it is understood that my invention is applicable to helical and herringbone gears as well, and to any form of tooth profile.

A concavely curved cutting edge 35 of a cutting tooth 36 is so formed, as to be capable of cutting the whole height of the tooth profiles 37 of a blank 38.

A similar cutting edge 39 is provided on a cutting tooth 40 to form the profiles 41 of blank 38. It is noted that the finishing edges 35 and 39 are located on different cutting teeth, which may be connected, as indicated in the drawing. The motions of cutting tool 42 and blank 38 are identical with the motions of tool 12 and blank 13 of Fig. 1 and Fig. 2. The finishing cuts, however, are applied alternately to the two sides of the teeth. In Fig. 4 the full lines indicate a cutting tooth 36 acting on tooth side 37, and the dotted lines indicate a cutting tooth 40 acting on tooth side 41 in a subsequent position of the cutting tool.

The shown tools 12 and 42, Fig. 1–4, contain multiple threads, and moreover their finishing edges, such as 11, 11′ on tool 12, have the same position along the hob axis. In other words, the number of flutes or gashes, which form the cutting faces, is identical with (Fig. 1), or a multiple (Fig. 3) of the number of threads.

Hobs of the known generating type, if multiple threaded, contain a number of flutes, which has no factor in common with the number of threads, so that every cutting tooth has a different axial position.

The tools 12 and 42 will cover a multiple of complete tooth profiles on the blank, per revolution of the tools, (namely four per tooth side, the shown tools having quadruple threads).

A usual known generating hob is single threaded, and will cover only one complete tooth profile per revolution, referring to one side of the teeth.

Hence it is obvious, that production can be greatly increased with the disclosed tools. When the gear cutting machines are built strong enough, the output of gears can be multiplied. Another feature of importance is that smooth tooth profiles are produced, which consist of continuous lines, and not of a series of flats.

The form of the finishing edges 10 and 11, Fig. 1 and Fig. 2, and of the finishing edges 35 and 39, Fig. 3 and Fig. 4 differ somewhat from the tooth profiles 19, 20 of the blank, or 37, 41 respectively. The difference is negligble on tools containing cutting teeth arranged in the form of a single thread, but increases with increasing number of threads.

Figure 5:
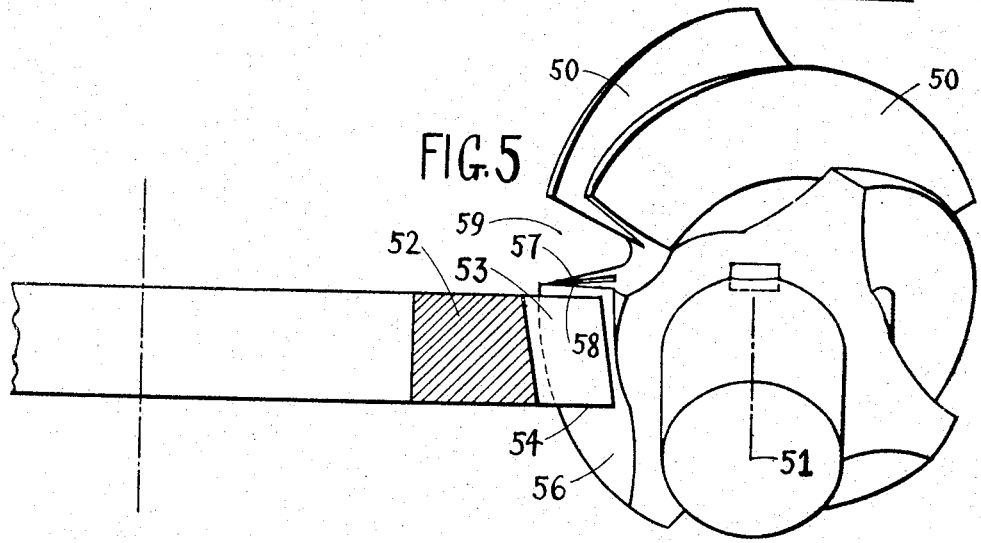
Fig. 5 is an oblique view of the threads, of which certain cutting edges of the tools shown in the Figures 1–4 form parts.

An accurate determination of the shape of a finishing cutting edge is indicated in Fig. 5. 50 denotes an unfinished cutting tool, or an auxiliary body of the same approximate shape. Axis 51 of body 50 is inclined to the angle, to which the cutting tool is set for cutting the teeth of a blank. 52 is a gear identical in shape with the blank to be cut, but for the feature, that its teeth 53 are relieved back of the front 54, and that it is hardened. Gear 52 bears exactly the same relation to body 50 as the blank (13 in Fig. 2) to the cutting tool (12). Body 50 and gear 52 are rotated in timed relation, and body 50 is fed past gear 52, exactly as if a cutting tool 50 would cut a blank 52. Threads 56 are then formed on body 50, which presently furnish the finishing edges 57, 58, when a thread 56 is gashed by a flute 59, identical to the one used on the actual cutting tool.

Cutting edges which shall serve for roughing only, must be inside the surface of thread 56, and not protrude over it. In other words such roughing edges lie on a surface, which can be obtained from the surface of thread 56 by further removing stock.

It is evident that also a single cutting tooth 53 may be employed, instead of a whole gear cutter 52.

In Fig. 6 a thread surface of the described type is embodied as a grinding member 60. It contains a single thread 61, of which several coils are indicated, and is shown in engagement with a gear blank 62. Gear blank 62 contains straight teeth 63 extending in the direction of its axis. The axis 64 of the grinding member is inclined to the plane of the gear which is also the plane of the drawing. The member is preferably so set, that the direction of its thread coincides with the direction of the teeth of the gear. This applies not only to straight teeth, but also to helical teeth.

If so desired, the grinding member may be differently set, and especially it may be so set, that its axis 64 is contained in a plane perpendicular to the axis of the gear, that is in the plane of the drawings. The generation of the threads, as indicated with reference to Fig. 5, will in all such cases result in surfaces, which are accurately conjugate to the teeth of the gear.

A grinding member may be fed like a hob relatively to a gear blank, namely in the direction of the axis of the blank. It is noted that the contour of the thread 61 is equal to the profiles of teeth 63, when the thread is viewed in the direction of the straight teeth, which is also the direction of its feed.

The contour of a hob thread of known type equals the profile of its basic rack. This profile is straight in the much used involute system. The profile of the thread of known hobs is therefore only tangent to the tooth profile of a gear, whereas the profile of the here considered thread fills a tooth space of a gear completely.

The surface of thread 61 (Fig. 6) or of thread 56 (Fig. 5) is conjugate to a gear (62 or 52 resp.) in such manner, that it meshes with line contact with said gear, contact being made along curved lines. The line contact is a consequence of the generation described. Considering an individual position between the thread surface and the gear, contact exists along a line or several lines. The lines of contact sweep either the whole or part of the respective surfaces during every engagement. An area will therefore successively be covered on the gear teeth in every engagement, which area may extend all over the teeth, when the face of the gear is not too large. In contra-distinction thereto only a single tooth profile is successively covered per engagement, when referring to hob threads, which are conjugate to racks.

A rotary member for forming gear teeth, having cutting portions so disposed that they all lie in surfaces of the above said character, could therefore cover and finish the whole tooth surfaces of a narrow face gear in a single position, while member and blank rotate in timed relation. On account of the difficulties inherent with the production of such hobs, which would contain relieved cutting teeth of changing profile, the type of hob already described is preferred. The said type of hob is provided with cutting teeth of constant curved profile, which are arranged in helicoidal threads. Such hobs require a feeding motion for finishing the teeth of a gear blank, as described.

It is however understood, that while the complete embodiment of threads 61 or 56 by cutting edges of a hob is not deemed practical at present, it might be so in some future time. Moreover the threads 61 or 56 can be embodied with grinding members, which naturally do not require relief, and so avoid the principal difficulty in making hobs representing the full threads.

Grinding members having threads 61 or 56 can also be made conjugate to bevel gears and hypoid gears.

In Fig. 7 a rotary member 66 for forming internal gears is shown in engagement with a blank. It is embodied as a grinding member. If embodied as a hob, the already described structure is preferably used; cutting edges of constant profile being arranged in helices. The profile of the cutting edges is then determined in the same manner as described with reference to Fig. 5.

In Fig. 8 a disk like cutting tool 68 is shown, which contains only finishing teeth, and resembles a milling cutter with formed cutting edges. The cutting teeth are however inclined to the front 69 of the tool, so that successive cutting teeth may act in successive tooth spaces of a blank.

The Figures 9 to 14 are developments to a plane of the peripheries of hobs, the cutting teeth being shown shaded. 70 denotes the developed periphery.

In Fig. 9, Fig. 10 and Fig. 11 cutting teeth are disposed in a thread 71, and alternate cutting teeth 72, 73 are provided with cutting faces 74, 75 of different inclination, to form keen cutting edges on alternate sides. In Fig. 9 the cutting faces 74, 75 are formed by continuous flutes, which pass all across the face of the hob. It is noted that the circular pitch is different on the two systems of flutes 74 and 75, the circular pitch of the flutes 75, considered inside of the reach of the cutting teeth, being smaller than the circular pitch of the flutes 74.

Fig. 10 differs from Fig. 9 by showing cutting faces which end on the thread 71, and which do not extend all across the face of the hob. Such cutting faces are more difficult to resharpen, but on the other hand permit to utilize the cutting teeth to a further extent.

While the Figures 9 and 10 show cutting teeth disposed on a single coil, Fig. 11 indicates an arrangement with cutting teeth 79 disposed in two coils of a single thread 71. Cutting faces 80 are formed on alternate teeth 81 by continuous flutes, which extend all over the face of the hob. Individual cutting faces 82 are formed on alternate teeth 83. Part of the cutting faces 82 are resharpened from the right hand side, and part from the left hand side, as will be clear to those skilled in the art.

According to the Figures 12 and 13, the cutting edges are arranged in separate groups 84, 85, which are adjustable with respect to each other by changing spacing ring 86. In Fig. 12, inwardly disposed finish cutting edges 87, 88 are formed by straight flutes 89 extending parallel to the hob axis, and by helical flutes 90 respectively. In Fig. 13, outwardly disposed finish cutting edges 91, 92 are formed by helical flutes 93 and by straight flutes 94 respectively. Hobs of this character, having very keen cutting edges, made possible through the present invention, are of vital importance for obtaining a smooth finish in most kinds of steel.

Fig. 14 is a development of a hob having cutting teeth disposed on two members 95, 96 which are adjustable relatively to each other, member 95 containing roughing teeth 97 in addition to finishing teeth 98.

The cutting teeth are arranged in helices, and the two sides of said cutting teeth are here shown arranged along helices 100, 101 of slightly different lead, shown as straight lines of different inclination. Outwardly disposed finish cutting edges are located on the dash and dot lines 102, 103.

Hobs constructed according to my invention may be relieved in any manner, the relieving tool moving radially towards a hob blank, or in the direction of the hob axis, or obliquely. Preferably, however, axial relief is provided. The relieved side surfaces, disposed back of the cutting edges, are then parts of true helicoidal surfaces.

In Fig. 15, a hob 105, constructed according to the present invention, contains cutting teeth arranged in multiple threads of an inclination equal to the inclination of the helical teeth of a blank 106. The hob 105 is set in a direction perpendicular to the axis 107 of the blank, and is so adjusted in the direction of its own axis, as corresponds to the determination of the cutting edges in a manner as indicated in Fig. 5. Hob 105 is then rotated on its axis, and the blank is rotated on its axis 107 in timed relation. The hob is then fed across the face of the blank in the direction of the blank axis 107, while such compensation of its relative angular position is provided with a differential, as corresponds to its advance in a direction other than the direction of its thread. This compensation is identical with the one used in standard hobbing practice. Hob 105 contains cutting teeth arranged on two members, which are adjustable with respect to one another, and which are provided with flutes of different inclination. Each group of cutting teeth is suited to finish one side of the teeth of the blank.

The hob 109 of Fig. 16 is set at such an angle, as corresponds to the determination of its cutting profiles in accordance with Fig. 5. The shown hob contains a cylindrical member 110, and a tapered or conical member 111. The latter is preferably provided with straight flutes 112, extending parallel to its axis.

Fig. 17 is a normal section through a pair of mating helical or herringbone gears, taken perpendicularly to the direction of the teeth. The shown tooth form is particularly suitable for production according to my method. The tooth profiles 113, 114 are convex and concave circular arcs of substantially equal radii 115, 116. Their centers 117, 118 are situated on the respective pitch surfaces 119, 120. Such teeth contact along their whole profiles at once, in the moment namely, when the centers 117, 118 of mating profiles contact at 121.

The same holds true for a gear of this type meshing with a helical worm thread. The correct profile of the latter is therefore also a circular arc of substantially equal radius.

When the profile of contact between such two bodies is embodied by a cutting edge, this cutting edge will be qualified to produce circular teeth of the described character, when rotated about the axis of the helical worm, and when given a proper feeding motion.

Fig. 18 indicates such a tool in cutting contact with a pinion 122, and Fig. 19 indicates a tool in contact with a gear blank 123. Cutting edge 124 is shown in cutting position in Fig. 18. The opposite cutting edge will be in cutting position 125, shown in dotted lines, after the blank has moved for a fraction of a pitch.

In Fig. 19 cutting edge 126 is seen in cutting position, while a cutting edge for finishng opposite tooth sides will be in cutting position 127 after the blank has moved on.

Axis 128 and axis 129 of the tools shown in Fig. 18 and Fig. 19 are inclined to the planes of the shown normal sections of the teeth, or also to the plane of the drawings. I preferably provide tools whose axes 128, 129 are inclined to said planes at angles which are considerably smaller than 60°. In other words, the axes 128, 129 are inclined to the direction of the teeth to be cut at angles in excess of 30°.

Fig. 20 is a development of a cutting tool of modified aspect, for cutting helical teeth of circular profile, as indicated in Fig. 17, and especially teeth of convex circular profile.

130 denotes the developed periphery of the tool. The cutting teeth 131 are shown in section and are shadowed. They are arranged in two separate groups, projecting from two parts 132, 133. The finishing edges 134, 135, 136 and 137, 138, 139 are inwardly disposed. Finishing edges which act on the same side of the teeth of a blank, such as 134, 135, 136, are located on a concentric circle, which is shown as a straight line 140 in development. In other words, the finishing edges 134, 135, 136 are angularly displaced, but have the same position along the axis of the tool.

The sides 141 on part 132, and sides 142 on part 133, which contain the finishing edges, are preferably relieved sidewise, away from each other, in addition to any desirable amount of radial or inward relief.

Fig. 21 is a development of a cutting tool having outwardly disposed finishing edges 143, 144, situated on lines 145, 146 respectively. The sides 143 on part 147, and sides 144 on part 148 are preferably relieved toward each other. A cutting tool as indicated in Fig. 21 may be used with advantage for cutting helical teeth for concave circular profile, as indicated in Fig. 17.

Inasmuch as helical gear teeth, as indicated in Fig. 17 will contact with a helical worm thread along a circular tooth profile, cutting edges arranged in the form of such helical thread, will not contact with a finished tooth surface, except for the one cutting edge which coincides with said contact line. Referring to one side of the teeth, all cutting edges but one do merely roughing work, when arranged in a predetermined helical thread.

Hence either side of the threads of a cutting tool may be provided with the same lead, as indicated by the parallel lines 149, 150 in Fig. 20, and lines 151, 152 in Fig. 21.

It is obvious that hobs or broadly rotary members for forming gears, of the type disclosed, must be set at a predetermined axial position, in analogy with milling cutters. When a hob is differently set along its axis, it will generally not produce the same teeth.

I have found that hobs for gears indicated in Fig. 17 are least sensitive to misadjustment. Such hobs, Figures 18-21, moreover may be used with mathematical accuracy on gears of different tooth numbers, like generating hobs, but unlike milling cutters. My hobs are therefore particularly valuable in this application.

The term "cutting" is used in the specification and in the claims in its broad meaning, as the equivalent of stock removing of any kind, and includes grinding, lapping, burnishing as well as cutting with an edge.

Various changes and modifications may be made in my invention by applying the knowledge and customary practice of the art and without departing from its spirit. For definition of the scope of my invention I rely on the appended claims.

What I claim is:

1. A rotary member for forming gears, adapted to operate with its axis offset from and angularly disposed to the axis of a gear blank and to be moved across the face of said gear blank substantially in the direction of the axis of the gear blank, said member having a working profile formed to finish a line of a different tooth surface in each revolution, said line extending from top to root on said tooth surface, and other working profiles arranged in a thread with said working profile.

2. A rotary member for forming gears, adapted to operate with its axis offset from and angularly disposed to the axis of a gear blank and to be moved across the face of said gear blank substantially in the direction of the axis of said gear blank, said member having a curved working profile formed to finish a line of a different tooth surface in each revolution, said line extending from top to root on said tooth surface, and other working profiles arranged in a thread with said working profile.

3. A rotary member for forming gears, adapted to operate with its axis offset from and angularly disposed to the axis of a gear blank and to be moved across the face of said gear blank substantially in the direction of the axis of said gear blank, said member having a concavely curved working profile formed to finish a line of a different tooth surface in each revolution, said line extending from top to root on said tooth surface.

4. A hob for cutting gears of constant profile, containing a plurality of curved cutting edges arranged in a thread, one of said cutting edges being so shaped as to finish the tooth surfaces from top to root.

5. A rotary tool for cutting gear teeth, having concavely curved cutting edges on cutting teeth which are inclined to the periphery of said tool, a cutting edge being suited to form the whole height of a tooth profile of the blank.

6. A hob for cutting gears of constant profile, containing cutting teeth arranged in the form of multiple threads, cutting faces being formed thereon by a number of flutes which contain a common factor with the number of threads.

7. A hob for cutting spur and helical gears having internally arranged tooth surfaces with concave profiles, containing curved cutting edges arranged in a thread, one cutting edge being conjugate to said concavely curved and internally arranged tooth surfaces, and being disposed to form the entire active height of said tooth surfaces.

8. A hob for cutting gear teeth of constant profile, containing two separate groups of concavely curved cutting edges, each group being suited to finish one side of the teeth of a blank.

9. A hob for cutting gear teeth of constant profile, consisting of two parts, said parts being adjustable with respect to one another, each part containing a plurality of identical concavely curved cutting edges of equal axial position respectively, the two parts being suited to finish opposite sides of the teeth.

10. A hob for cutting gear teeth of constant profile, containing two groups of curved cutting edges disposed on two members, said members being adjustable relatively to each other, the portions back of the cutting edges being relieved in axial direction and forming parts of true helicoidal surfaces, said helicoidal surfaces being concentric with said hob.

11. A hob for cutting gear teeth of constant profile, having curved cutting edges arranged in two separate groups, said groups containing flutes of different inclination, each group containing at least one cutting edge suited to finish the whole height of the tooth surfaces of one side of the teeth of a gear blank.

12. A hob for cutting gears of constant profile, having finish cutting edges arranged in two separate groups, each group being suited to finish cut one side of the teeth of a gear blank, the finish cutting edges of said two groups being outwardly disposed with respect to each other.

13. A hob for cutting spur and helical gears having internally arranged tooth surfaces with concave profiles, containing curved cutting edges arranged in a helical thread, the two sides of said thread having a different lead, one cutting edge being conjugate to said concavely curved and internally arranged tooth surfaces, and being disposed to form the entire active height of said tooth surfaces.

14. A rotary member for successively forming gears having constant tooth profiles in parallel planes perpendicular to a gear axis, containing cutting portions arranged in threads inclined to the periphery of said member, the cutting portions of different threads having equal positions lengthwise of said threads, a cutting portion lying on a surface which is conjugate to a gear of constant tooth profile in such manner that it meshes with line contact with said gear, in an angular and offset relative position of the axes of said gear and said member.

15. A tool for cutting gears having constant tooth profiles in parallel planes perpendicular to a gear axis, containing a plurality of cutting teeth arranged about an axis and disposed at an angle to the periphery of said tool, said angle being smaller than sixty degrees, equal curved cutting edges formed on said cutting teeth, a plurality of said cutting edges having equal positions lengthwise of the tool axis and being suited to finish the tooth surfaces along lines, in an angular and offset relative position of the axes of a gear blank and said tool, said lines extending from top to root on the tooth surfaces.

16. A rotary abrading member for successively forming gears having constant tooth profiles in parallel planes perpendicular to a gear axis, containing working portions disposed in a thread inclined to the periphery of said member, said thread having a curved profile in an axial section and being fully conjugate to a gear to be formed so as to mesh with line contact with said gear, in an angular and offset relative position of the axes of said gear and said member.

17. A rotary abrading member for successively forming gears having constant tooth profiles in parallel planes perpendicular to a gear axis, containing a plurality of identical abrading threads inclined to the periphery of said member, said threads having a curved profile in an axial section and being fully conjugate to a gear to be formed so as to mesh with line contact with said gear, in an angular and offset relative position of the axes of said gear and said member.

18. A rotary abrading member for successively forming gears having constant tooth profiles in parallel planes perpendicular to a gear axis, containing an abrading thread inclined to the periphery of said member, said thread having a concavely curved profile in an axial section and being fully conjugate to a gear to be formed so as to mesh with line contact with said gear, in an angular and offset relative position of the axes of said gear and said member.

19. A rotary abrading member for successively forming gears having constant tooth profiles in parallel planes perpendicular to a gear axis, having a concave general contour on its outside and containing working portions disposed in a thread inclined to the periphery of said member, said thread having a curved profile in an axial section and being fully conjugate to a gear to be formed so as to mesh with line contact with said gear, in an angular and offset relative position of the axes of said gear and said member.

20. A rotary abrading member for successively forming gears having constant tooth profiles in parallel planes perpendicular to a gear axis, containing working portions disposed in a thread inclined to the periphery of said member, said thread having a curved profile in an axial section and being fully conjugate to a gear to be formed so as to mesh with line contact with said gear, in an angular and offset relative position of the axes of said gear and said member, the threaded zone of said member extending axially a distance larger than twice its pitch.

21. A rotary abrading member for successively forming gears having constant tooth profiles in parallel planes perpendicular to a gear axis, containing a working portion of thread form, the profile of said thread having an inclination changing lengthwise of said thread with respect to the thread axis.

22. A rotary abrading member for successively forming gears having constant tooth profiles in parallel planes perpendicular to a gear axis, containing a working portion of thread form, the profile of said thread being curved and having an inclination changing lengthwise of said thread with respect to the thread axis.

23. A rotary abrading member for successively forming gears having constant tooth profiles in parallel planes perpendicular to a gear axis, having a concave general outline and containing a working portion of thread form, the profile of said thread having an inclination changing lengthwise of said thread with respect to the thread axis.

24. A rotary abrading member for successively forming equal gears having a shape differing from the shape of the mating gear of a gear to be abraded and suited to mesh with said gear to be abraded in the manner of a pair of gears having angularly disposed and offset axes, the side profiles of a working portion of said member having a changing inclination with respect to its axis of rotation.

25. A rotary abrading member for successively forming equal gears having constant tooth profiles in parallel planes perpendicular to a gear axis, having a shape differing from the shape of the mating gear of a gear to be abraded and suited to mesh with said gear to be abraded in the manner of a pair of gears having angularly disposed and offset axes, the side profiles of a working portion of said member having a changing inclination with respect to its axis of rotation.

26. A rotary abrading member for successively forming equal gears, having a shape differing from the shape of the mating gear of a gear to be abraded and suited to mesh with line contact with said gear to be abraded in the manner of a pair of fully conjugate gears having angularly disposed and offset axes, the side profiles of a working portion of said member having a changing inclination with respect to its axis of rotation.

27. A rotary abrading member for successively forming gears having constant tooth profiles in planes perpendicular to a gear axis, having a shape differing from the shape of the mating gear of a gear to be abraded and suited to mesh with said gear to be abraded in the manner of a pair of gears having angularly disposed and offset axes, a working portion of said member having curved side profiles of changing inclination with respect to the axis of rotation.

28. A rotary gear cutting tool having a plurality of outwardly projecting cutting teeth arranged in a thread, each thread side having at least one rough cutting edge and a single finish cutting edge, said finish cutting edge being formed to finish the tooth surfaces from top to root.

29. A rotary gear cutting tool having a plurality of outwardly projecting cutting teeth arranged in a thread, the two sides of said thread having different leads, each of said sides containing at least one rough cutting edge and a single finish cutting edge formed to finish the tooth surfaces from top to root.

30. A gear cutting tool adapted to operate with its axis angularly disposed to the axis of a gear blank and to be moved across the gear face substantially in the direction of the axis of said gear blank, having a plurality of equal cutting teeth disposed to enter successive tooth spaces of said gear blank and inclined to the direction of the tool axis at an angle of at least thirty degrees (30°), said cutting teeth containing identical cutting edges formed to finish the whole height of the active tooth surfaces of said gear blank and having the same position lengthwise of the tool axis.

31. A gear cutting tool adapted to operate with its axis offset from and angularly disposed to the axis of a gear blank and to be moved across the gear face substantially in the direction of the axis of the gear blank, having a plurality of equal cutting teeth disposed to enter successive tooth spaces of said gear blank and inclined to the direction of the tool axis at an angle of at least thirty degrees (30°), said cutting teeth containing identical curved cutting edges formed to finish the whole height of the active tooth surfaces of said gear blank and having the same position along the tool axis.

32. A gear cutting tool adapted to be moved across the face of a gear blank substantially in the direction of the axis of said gear blank, having a plurality of equal cutting teeth disposed to enter successive tooth spaces of said gear blank while being turned on an axis angularly disposed to and offset from the axis of said gear blank, said cutting teeth containing identical curved side cutting edges formed to finish the whole height of the active tooth surfaces of said gear blank and having the same position along the tool axis, said side cutting edges being disposed entirely on one side of the point of closest approach of the tool axis with respect to the blank axis.

ERNEST WILDHABER.